(12) United States Patent
Peng

(10) Patent No.: US 12,137,444 B2
(45) Date of Patent: Nov. 5, 2024

(54) COMMUNICATION METHOD AND DEVICE

(71) Applicant: Huawei Technologies Co., Ltd., Shenzhen (CN)

(72) Inventor: Jindong Peng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 433 days.

(21) Appl. No.: 17/468,093

(22) Filed: Sep. 7, 2021

(65) Prior Publication Data

US 2021/0410142 A1    Dec. 30, 2021

Related U.S. Application Data

(63) Continuation of application No. PCT/CN2020/077359, filed on Feb. 29, 2020.

(30) Foreign Application Priority Data

Mar. 25, 2019 (CN) .................. 201910229649.3

(51) Int. Cl.
*H04W 72/0453* (2023.01)
*H04B 7/0452* (2017.01)
*H04L 25/00* (2006.01)
*H04L 25/02* (2006.01)
*H04W 72/566* (2023.01)
*H04W 88/08* (2009.01)

(52) U.S. Cl.
CPC ...... *H04W 72/0453* (2013.01); *H04B 7/0452* (2013.01); *H04L 25/00* (2013.01); *H04L 25/02* (2013.01); *H04W 72/566* (2023.01); *H04W 88/085* (2013.01)

(58) Field of Classification Search
CPC .......... H04W 72/0453; H04W 88/085; H04W 72/566; H04W 72/542; H04L 25/02; H04L 5/0064; H04L 5/0037; H04L 25/00; H04B 7/0837; H04B 7/0874; H04B 7/0452

See application file for complete search history.

(56) References Cited

U.S. PATENT DOCUMENTS

2006/0291373 A1* 12/2006 Nakao .................. H04B 7/0671
370/208
2010/0098020 A1* 4/2010 Kim ...................... H04L 5/0053
370/330

(Continued)

FOREIGN PATENT DOCUMENTS

CN    101102606 A    1/2008
CN    100372265 C    2/2008

(Continued)

*Primary Examiner* — Anh Ngoc M Nguyen
*Assistant Examiner* — Bradley D Lytle, Jr.
(74) *Attorney, Agent, or Firm* — Slater Matsil, LLP

(57) ABSTRACT

The disclosure includes a method of receiving, by a BBU, M groups of signals, where each group of signals includes N signals, M is an integer greater than 0. Some methods further include N is a maximum quantity of signals supported when a physical cell of the BBU demodulates a signal. Some methods further include determining, by the BBU, H groups of signals that carry data and that are in the M groups of signals, where $0<H\leq M$. Some methods further include combining, by the BBU, the H groups of signals into one group of data and demodulating, by the BBU, the combined group of data.

18 Claims, 11 Drawing Sheets

(56) References Cited

U.S. PATENT DOCUMENTS

| | | |
|---|---|---|
| 2010/0120358 A1 | 5/2010 | Wan |
| 2010/0296469 A1 | 11/2010 | Zhou et al. |
| 2013/0170353 A1* | 7/2013 | Liu .................. H04W 72/52 |
| | | 370/235 |
| 2014/0106695 A1* | 4/2014 | Luz .................. H04B 7/0874 |
| | | 455/273 |
| 2017/0048726 A1* | 2/2017 | Zhang ................ H04W 88/08 |
| 2017/0270935 A1* | 9/2017 | Atti .................. G10L 19/167 |

FOREIGN PATENT DOCUMENTS

| | | | |
|---|---|---|---|
| CN | 103516447 A | 1/2014 | |
| CN | 104253640 A | 12/2014 | |
| CN | 104980382 A | 10/2015 | |
| CN | 105634566 A | 6/2016 | |
| EP | 1954075 A1 | 8/2008 | |
| WO | WO-2005117475 A1 * | 12/2015 | .......... H04W 88/085 |
| WO | 2017000699 A1 | 1/2017 | |
| WO | 2019001748 A1 | 1/2019 | |

* cited by examiner

| TTI | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|---|---|---|---|---|---|---|---|---|---|---|---|
|  | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 8

| pRRU ID | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 10 ms | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 ms | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 30 ms | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| 40 ms | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |

FIG. 9

COMMUNICATION METHOD AND DEVICE

CROSS-REFERENCE TO RELATED APPLICATIONS

This application is a continuation of International Application No. PCT/CN2020/077359, filed on Feb. 29, 2020, which claims priority to Chinese Patent Application No. 201910229649.3, filed on Mar. 25, 2019. The disclosures of the aforementioned applications are hereby incorporated by reference in their entireties.

TECHNICAL FIELD

This application relates to the field of communication technologies, and in particular, to a communication method and device.

BACKGROUND

With the development of communication technologies, indoor areas have become places with heavy mobile service traffic. In a current indoor signal coverage technology, a base station structure uses a three-layer structure, including: a baseband processing unit (base band unit, BBU), a remote radio unit hub (RHUB), and a pico RRU (pRRU). One BBU may be connected to one or more RHUBs, and one RHUB may be connected to a plurality of pRRUs. A working principle is as follows. A BBU sends signals to an RHUB. The RHUB is connected to pRRUs through network cables. The RHUB distributes the signals to the pRRUs. The pRRUs process the signals into radio frequency signals, and transmit the radio frequency signals to indoor areas through a transmission device such as a radio frequency feeder, a combiner/divider, or an antenna. An indoor terminal sends feedback signals to the pRRUs, and the pRRUs send the feedback signals to the RHUB. The RHUB performs radio frequency combination on uplink data and sends combined uplink data to the BBU for demodulation. Therefore, a same cell configured by a plurality of pRRUs may also be referred to as a radio frequency combination cell.

After radio frequency combination is performed on the uplink data of the plurality of pRRUs, a noise floor increases. The more pRRUs are combined, the higher the noise floor increases. For example, if 16 pRRUs are combined, an uplink noise floor increases by 12 dB. If 32 pRRUs are combined, an uplink noise floor increases by 15 dB. Because terminal transmit power is fixed, uplink performance deteriorates after the noise floor increases. Therefore, a quantity of pRRUs needs to be reduced from a perspective of the uplink performance. However, when the quantity of pRRUs is relatively small, more BBUs may be needed. As a result, costs of carriers are increased. Therefore, the uplink performance and low costs cannot be balanced.

SUMMARY

Embodiments of this application provide a communication method and device, to resolve a problem in a current technology that uplink performance and low costs cannot be balanced when radio frequency combination is performed on uplink data of a plurality of pRRUs.

According to a first aspect, an embodiment of this application provides a communication method. The method includes: A BBU receives M groups of signals, where each group of signals includes N signals, M is an integer greater than 0, and N is a maximum quantity of signals supported when a physical cell of the BBU demodulates a signal; the BBU determines H groups of signals that carry data and that are in the M groups of signals, where $0<H \leq M$; the BBU combines the H groups of signals into one group of data; the BBU demodulates the combined group of data. In this embodiment of this application, the BBU receives the M groups of signals, combines the H groups of signals that carry data and that are in the M groups of signals, and demodulates the combined H groups of signals. In this manner, when the signals are combined, signals that do not carry data may not be combined, so that noise floors of the signals that do not carry data may not be combined, and uplink performance can be improved without reducing a quantity of pRRUs. In addition, currently, a baseband processing resource of a physical cell is fixed. Therefore, a maximum quantity of signals, for example, N, supported when the physical cell demodulates a signal is fixed. In this case, the physical cell may support scheduling of a maximum of one RHUB. In this embodiment of this application, the physical cell may receive M×N signals, that is, the physical cell may support M RHUBs. It can be learned that in this embodiment of this application, a coverage area of the physical cell can be improved without affecting the uplink performance, thereby reducing costs.

In a possible design, that the BBU combines the H groups of signals into one group of data may include: The BBU converts the H groups of signals to a frequency domain, to obtain H groups of frequency domain signals; the BBU combines the H groups of frequency domain signals. In the foregoing design, the BBU may combine the H groups of signals in frequency domain by converting the H groups of signals to the frequency domain.

In a possible design, that the BBU combines the H groups of frequency domain signals may include: For an $i^{th}$ frequency domain signal in each group of frequency domain signals, the BBU determines a frequency band that carries data and that is in the $i^{th}$ frequency domain signal, where i is an integer not greater than N; the BBU combines frequency bands that carry data and that are in the $i^{th}$ frequency domain signals in all groups of frequency domain signals, to obtain an $i^{th}$ signal in the group of data. According to the foregoing design, when performing frequency domain combination, the BBU may not combine frequency bands that do not carry data, so that a noise floor of data obtained through frequency domain combination can be reduced, and the uplink performance can be improved without reducing the quantity of pRRUs. For example, in a current technology, after receiving time domain signals of four pRRUs, an RHUB performs radio frequency combination on the time domain signals of the four pRRUs. In this case, a noise floor increases by $10 \times \log_{10}$(a quantity of pRRUs participating in combination), that is, $10 \times \log_{10} 4 = 6$ dB. According to the method provided in this application, the time domain signals of the four pRRUs are divided into two groups and then radio frequency combination is performed. Each group includes two pRRUs, that is, two pRRUs participate in combination. Because frequency bands that do not carry data may not be combined during frequency domain combination, the noise floor does not increase when frequency domain combination is performed. In this case, the noise floor increases by $10 \times \log_{10}$(the quantity of pRRUs participating in combination), that is, $10 \times \log_{10} 2 = 3$ dB. It can be learned that the method provided in this application can improve the uplink performance without reducing the quantity of pRRUs.

In a possible design, that the BBU combines the H groups of signals into one group of data may include: The BBU combines $i^{th}$ signals in all of the H groups of signals in time domain to obtain an $i^{th}$ signal in the group of data, where i is an integer not greater than N. According to the foregoing design, the BBU combines the H signals that carry data in time domain, so that the noise floors of the signals that do not carry data may not be combined, thereby reducing a noise floor increase of combined data, and further improving the uplink performance.

In a possible design, at least one group of signals in the M groups of signals may be obtained after the RHUB combines, in time domain, signals sent by a plurality of pico remote radio units pRRUs.

According to a second aspect, an embodiment of this application provides a communication method. The method includes: An RHUB receives signals sent by P pRRUs, where P is an integer greater than or equal to 2; the RHUB determines, from the P pRRUs, at least two target pRRUs on which radio frequency combination is to be performed; the RHUB performs, in time domain, radio frequency combination on received signals sent by the at least two target pRRUs, to obtain a combined signal; the RHUB sends the combined signal to a physical layer entity for demodulation. In this embodiment of this application, the RHUB selects some pRRUs from all pRRUs to perform radio frequency combination, so that a quantity of pRRUs participating in radio frequency combination is reduced, and a noise floor during radio frequency combination can be reduced. In this way, uplink performance can be improved without reducing a quantity of pRRUs.

In a possible design, the RHUB may receive indication information sent by a BBU, where the indication information is used to indicate information about pRRUs on which radio frequency combination can be performed in each time period in a scheduling periodicity. Therefore, the RHUB can divide the P pRRUs into M pRRU groups based on the indication information, where M is a quantity of divided time periods in the scheduling periodicity, and any pRRU group in the M pRRU groups includes pRRUs on which radio frequency combination can be performed in a corresponding time period. The RHUB determines a target pRRU group from the M pRRU groups, and determines a plurality of pRRUs included in the target pRRU group as the at least two target pRRUs on which radio frequency combination is to be performed, where the target pRRU group includes pRRUs on which radio frequency combination can be performed in a current time period. In the foregoing design, the RHUB may determine, as indicated by the RHUB, some pRRUs on which radio frequency combination is performed in the current time period. Compared with a current technology in which radio frequency combination is performed on all pRRUs, the foregoing design can reduce the quantity of pRRUs participating in radio frequency combination. In this way, the noise floor during radio frequency combination can be reduced, and the uplink performance can be improved without reducing the quantity of pRRUs.

In a possible design, the RHUB may obtain priorities respectively corresponding to the M pRRU groups; the RHUB may adjust a sequence of the M pRRU groups based on the priorities respectively corresponding to the M pRRU groups; the RHUB determines the target pRRU group based on an adjusted sequence. According to the foregoing design, the RHUB can preferentially schedule a pRRU group having a higher priority, so that a scheduling interval of the pRRU group having the higher priority can be reduced, and the uplink performance can be improved.

In a possible design, that the RHUB obtains priorities respectively corresponding to the M pRRU groups may include: For each pRRU group in the M pRRU groups, the RHUB obtains a priority of a user who can be scheduled by each pRRU included in the pRRU group; the RHUB determines a priority of the pRRU group based on the priority of the user who can be scheduled by each pRRU included in the pRRU group. In the foregoing design, the RHUB determines the priority of the pRRU group based on the priority of the user, so that the RHUB can preferentially schedule a user having a higher priority, thereby reducing a scheduling interval of the user having the higher priority, and improving the uplink performance.

According to a third aspect, an embodiment of this application provides a communication method. The method includes: A pRRU determines N users who can be scheduled; the pRRU determines priorities of the N users; the pRRU schedules M users in the N users based on the priorities of the N users, where $0<M\leq N$, and both N and M are integers; the pRRU sends, to an RHUB, uplink signals that are respectively sent by the scheduled M users. In this embodiment of this application, the pRRU first determines the users who can be scheduled, and then schedules the users based on the priorities of the users, so that the pRRU can accurately obtain the uplink signals of the users. In this embodiment of this application, a user having a higher priority can be scheduled in time. In this way, impact on user services can be reduced.

In a possible design, that a pRRU determines N users who can be scheduled may include: The pRRU receives sounding reference signals SRSs respectively sent by a plurality of users; the pRRU determines that the N users sending SRSs whose signal strengths are greater than a preset threshold are users who can be scheduled. In the foregoing design, the pRRU may determine, based on signal strength of an SRS, whether the user sending the SRS is a user scheduled by the pRRU, and signal strength of an SRS sent by the user scheduled by the pRRU is relatively high.

In a possible design, before the pRRU determines the N users who can be scheduled, the pRRU may determine that data needs to be reported to the RHUB. In the foregoing design, time-sharing scheduling is performed on the pRRUs, and different pRRUs are scheduled in different time periods, so that a quantity of pRRUs participating in radio frequency combination can be reduced without reducing a coverage area of a physical cell, and a noise floor increase during radio frequency combination can be reduced. In this way, uplink performance can be improved.

In a possible design, that the pRRU may determine that data needs to be reported to the RHUB may include: The pRRU receives indication information sent by a baseband processing unit, where the indication information is used to indicate a time point at which the pRRU reports the data; when the time point arrives, the pRRU determines that the data needs to be reported to the RHUB. In the foregoing design, the pRRU may determine, as indicated by the BBU, the time point at which the data is reported, that is, a time point at which the data is scheduled, so that the pRRU may report the data in the time period.

In a possible design, the pRRU may further report priorities of the M users to the RHUB. According to the foregoing design, the RHUB can receive a priority of each user of each pRRU in a pRRU group, so that a priority of the pRRU group can be determined based on the priority of each user, and a scheduling sequence of the pRRU group may be adjusted based on the priority of the pRRU group. In this way, the RHUB can preferentially schedule a user having a higher priority, thereby reducing a scheduling interval of the user having the higher priority, and improving uplink performance.

According to a fourth aspect, an embodiment of this application provides a communication method. The method includes: A BBU receives a combined signal sent by at least one RHUB; the BBU demodulates a combined signal sent by a first RHUB, where the first RHUB is any RHUB in the at least one RHUB. In this embodiment of this application, the BBU selects one RHUB from all RHUBs for demodulation, so that a maximum quantity of combined pRRUs supported by a single physical cell can be increased without changing uplink performance and an RHUB specification, thereby increasing a coverage area. For example, in a current technology, a physical cell supports signal processing of one RHUB. Therefore, a physical cell entity may be connected to one RHUB. Assuming that one RHUB is connected to a maximum of 16 pRRUs, a coverage area of one physical cell is a coverage area covered by the 16 pRRUs. According to the method provided in this application, one physical cell can support two or more RHUBs. In this case, a coverage area of one physical cell may be a coverage area covered by 32 pRRUs or more pRRUs. In addition, when the coverage area is increased, the uplink performance may not be affected.

In a possible design, before demodulating the combined signal sent by the first RHUB, the BBU may determine that a priority of the first RHUB is the highest in the at least one RHUB. In the foregoing design, the BBU preferentially demodulates an RHUB having a higher priority, so that a scheduling interval of the RHUB having the higher priority can be reduced, and the uplink performance can be improved.

According to a fifth aspect, this application provides a communication apparatus. The apparatus may be a BBU, or may be a chip or a chip set in the BBU. The apparatus may be an RHUB, or may be a chip or a chip set in the RHUB. The apparatus may be a pRRU, or may be a chip or chip set in the pRRU. The apparatus may include a processing unit and a transceiver unit. When the apparatus is the BBU, the RHUB, or the pRRU, the processing unit may be a processor, and the transceiver unit may be a transceiver. The apparatus may further include a storage unit, and the storage unit may be a memory. The storage unit is configured to store instructions, and the processing unit executes the instructions stored in the storage unit, so that the BBU performs a corresponding function in the first aspect; or the processing unit executes the instructions stored in the storage unit, so that the RHUB performs a corresponding function in the second aspect; or the processing unit executes the instructions stored in the storage unit, so that the pRRU performs a corresponding function in the third aspect. When the apparatus is the chip or the chip set, the processing unit may be a processor, and the transceiver unit may be an input/output interface, a pin, a circuit, or the like. The processing unit executes the instructions stored in the storage unit, so that the BBU performs a corresponding function in the first aspect; or the processing unit executes the instructions stored in the storage unit, so that the RHUB performs a corresponding function in the second aspect; or the processing unit executes the instructions stored in the storage unit, so that the pRRU performs a corresponding function in the third aspect. The storage unit may be a storage unit (for example, a register or a buffer) in the chip or the chip set, or may be a storage unit (for example, a read-only memory or a random access memory) that is in the terminal device and that is located outside the chip or the chip set.

According to a sixth aspect, a communication apparatus is provided. The apparatus includes a processor, a communication interface, and a memory. The communication interface is configured to perform transmission of information, and/or a message, and/or data between the apparatus and another apparatus. The memory is configured to store computer-executable instructions; and when the apparatus runs, the processor executes the computer-executable instructions stored in the memory, so that the apparatus performs the communication method according to any one of the first aspect or the designs of the first aspect, the communication method according to any one of the second aspect or the designs of the second aspect, or the communication method according to any one of the third aspect or the designs of the third aspect.

According to a seventh aspect, this application further provides a computer-readable storage medium. The computer-readable storage medium stores instructions. When the instructions are run on a computer, the computer is enabled to perform the methods according to the foregoing aspects.

According to an eighth aspect, this application further provides a computer program product including instructions. When the instructions are run on a computer, the computer is enabled to perform the methods according to the foregoing aspects.

BRIEF DESCRIPTION OF THE DRAWINGS

FIG. 8 is a schematic diagram of indication information according to an embodiment of this application;

FIG. 9 is another schematic diagram of indication information according to an embodiment of this application;

DETAILED DESCRIPTION OF ILLUSTRATIVE EMBODIMENTS

Figure 1:
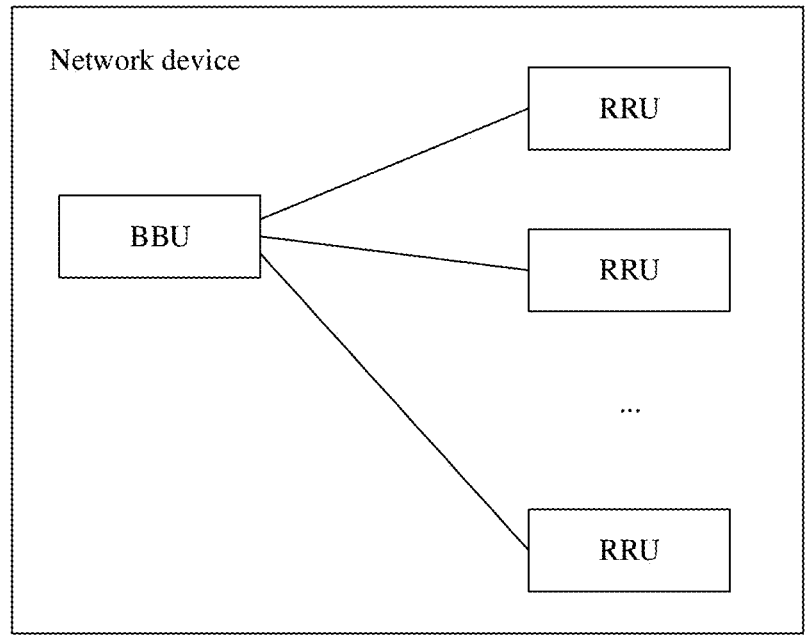
FIG. 1 is a schematic diagram of a structure of a network device divided into a CU and a DU according to an embodiment of this application.

To make objectives, technical solutions, and advantages of embodiments of the present invention clearer, the following clearly and completely describes the technical solutions in the embodiments of the present invention with reference to the accompanying drawings in the embodiments of the present invention.

The communication method provided in this application may be applied to various communication systems, for example, may be an internet of things (IoT) system, a narrowband internet of things (NB-IoT) system, or a long term evolution (LTE) system, or may be a fifth generation (5G) communication system, or may be a hybrid architecture of LTE and 5G, or may be a 5G new radio (new radio, NR) system, a global system for mobile communication (GSM) system, a mobile telecommunications system (UMTS), a code division multiple access (CDMA) system, and a new communication system that will emerge in future communication development.

A terminal device in the embodiments of this application may be a device that provides a user with voice/data connectivity, for example, a handheld device or vehicle-mounted device having a wireless connection function. The terminal device may alternatively be another processing device connected to a wireless modem. The terminal device may communicate with one or more core networks via a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, user equipment, or the like. The terminal device may be a mobile terminal, for example, a mobile phone (or referred to as a "cellular" phone), and a computer that has a mobile terminal. For example, the terminal device may be a portable, pocket-size, handheld, computer built-in, or vehicle-mounted mobile apparatus, which exchanges a voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. However, this is not limited in the embodiments of this application.

A network device in the embodiments of this application may be configured to perform mutual conversion between a received over-the-air frame and an internet protocol (IP) packet, and serves as a router between the terminal device and a remaining part of an access network, where the remaining part of the access network may include an IP network or the like. The network device may further coordinate attribute management of an air interface. For example, the network device may be a base transceiver station (BTS) in a global system for mobile communication (GSM) or code division multiple access (CDMA), a NodeB in wideband code division multiple access (WCDMA), an evolved NodeB (evolutional Node B, eNB, or e-NodeB) in LTE, a new radio controller (NR controller), a gNodeB (gNB) in a 5G system, a centralized network element (centralized unit), a new radio base station, a remote radio module, a micro base station, a relay, a distributed network element (distributed unit), a reception point (TRP) or a transmission point (TP), or any other radio access device. However, this is not limited in the embodiments of this application. The network device may cover one or more cells.

Further, the network device designed in the embodiments of this application may use a distributed architecture. The network device in the distributed architecture includes one or more radio frequency units, for example, a remote radio unit (RRU) and one or more baseband units BBU) (which may also be referred to as a digital unit (DU)). As shown in FIG. 1, it should be understood that FIG. 1 is merely an example for description, and a quantity of BBUs and a quantity of RRUs included in the network device are not specifically limited. The RRU may include at least one antenna. The RRU is mainly configured to send and receive a radio frequency signal and perform conversion between the radio frequency signal and a baseband signal. For example, the RRU is configured to send information/data/a message/instructions to a terminal device. The BBU is mainly configured to perform baseband processing, control the network device, and so on. The RRU and the BBU may be physically disposed together, or may be physically separated, namely, a distributed base station.

Figure 2:
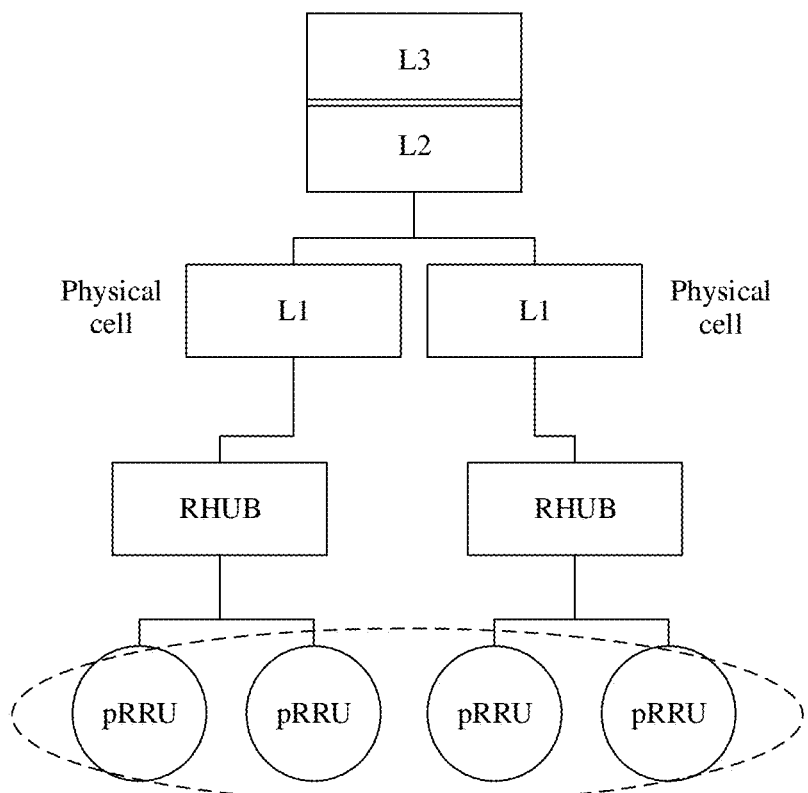
FIG. 2 is a schematic diagram of a structure of a network device in a LampSite architecture according to an embodiment of this application.

Alternatively, the network device designed in the embodiments of this application may use a LampSite architecture. LampSite uses a BBU+RHUB+pRRU system architecture. A base station includes the baseband unit (BBU), the pico remote radio unit (pRRU), and the remote radio unit hub (RHUB). One BBU may be connected to one or more RHUBs, and one RHUB may be connected to a plurality of pRRUs. As shown in FIG. 2, it should be understood that FIG. 2 is merely an example for description, and a quantity of BBUs, a quantity of RHUBs, and a quantity of pRRUs included in the network device are not specifically limited. A working principle is as follows. In a downlink direction, the BBU sends signals to the RHUB. The RHUB is connected to pRRUs through network cables. The RHUB distributes the signals to the pRRUs. The pRRUs process the signals into radio frequency signals, and transmit the radio frequency signals to indoor areas through a transmission device such as a radio frequency feeder, a combiner/divider, or an antenna. In an uplink direction, an indoor terminal sends feedback signals to the pRRUs, and the pRRUs send the feedback signals to the RHUB. The RHUB performs radio frequency combination on uplink data and sends combined uplink data to the BBU for demodulation. Therefore, a same cell configured by a plurality of pRRUs may also be referred to as a radio frequency combination cell. The network device may cover one logical cell, a plurality of physical cells may be configured for the logical cell, and each physical cell may be connected to a plurality of pRRUs. The physical cell is a baseband processing resource. For example, one physical cell may correspond to a modulation and demodulation capability of an LTE air interface bandwidth of 20 M.

After radio frequency combination is performed on the uplink data of the plurality of pRRUs, a noise floor increases by $10 \times \log_{10}$(a quantity of combined pRRUs). The more pRRUs are combined, the higher the noise floor increases. For example, if 16 pRRUs are combined, an uplink noise floor increases by 12 dB. If 32 pRRUs are combined, an uplink noise floor increases by 15 dB. Because terminal transmit power is fixed, uplink performance deteriorates after the noise floor increases. Therefore, a quantity of pRRUs needs to be reduced from a perspective of uplink performance.

The LampSite architecture is proposed to provide a low-cost coverage solution. However, when a small quantity of pRRUs are combined, costs of carriers increase. For example, if a physical cell supports combination of a maximum of 16 pRRUs, if 17 pRRUs are required for coverage in an area, two physical cells are required. In this case, customers need to pay more money. Although a newly purchased physical cell has an air interface demodulation capability of 20 M, there is no capacity requirement due to a coverage scenario. Therefore, customers cannot obtain a capacity gain. Therefore, a quantity of pRRUs used for radio frequency combination needs be increased from a perspective of costs.

Therefore, the uplink performance and low costs cannot be balanced.

Based on this, embodiments of this application provide a communication method and device, to resolve a problem in a current technology that the uplink performance and the low costs cannot be balanced. The method and the apparatus are conceived based on a same technical concept. The method and the device have similar principles for resolving problems. Therefore, for implementation of the apparatus and the method, refer to each other. Details are not repeatedly described.

"A plurality of" mentioned in the embodiments of this application means two or more.

It should be understood that, in descriptions of this application, words such as "first" and "second" are merely used for distinction and description, and shall not be understood as an indication or implication of relative importance or an indication or implication of an order.

Figure 3:
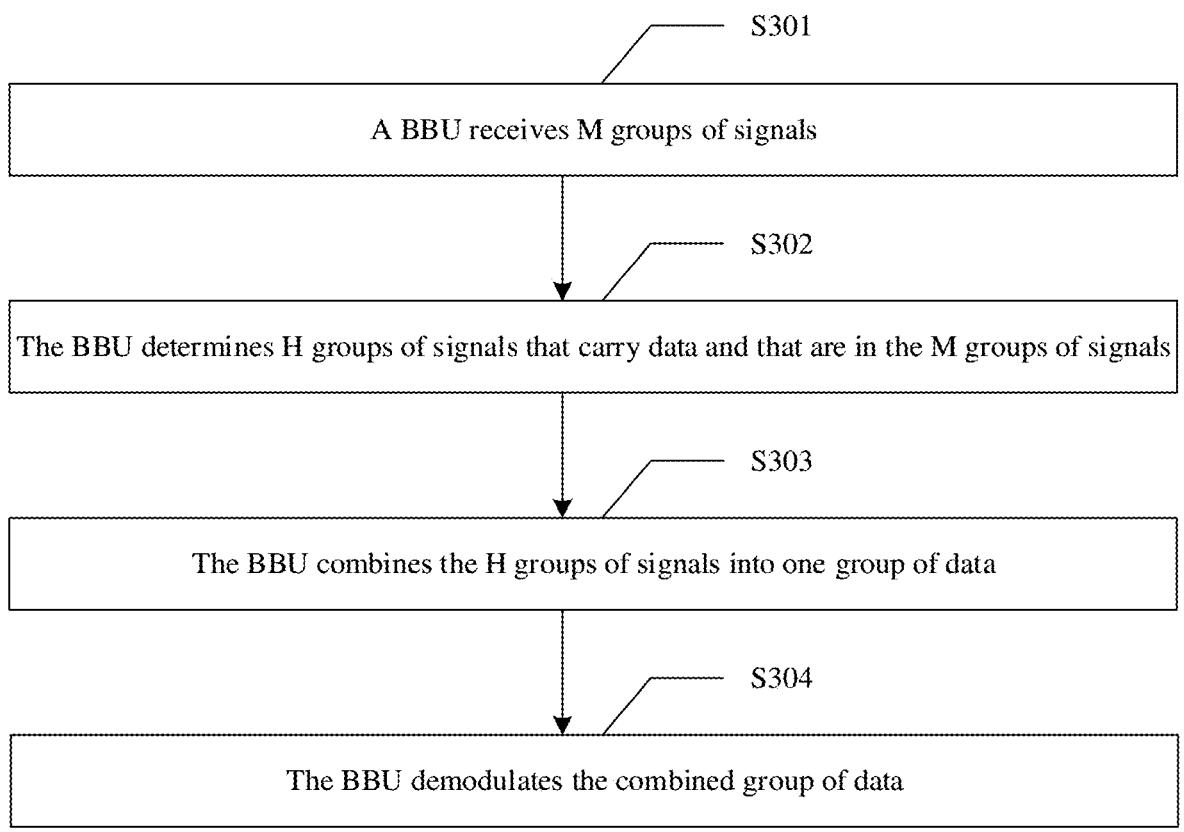
FIG. 3 is a flowchart of a communication method according to an embodiment of this application.

FIG. 3 is a flowchart of a communication method according to this application. The method may be applied to the network device shown in FIG. 1 or FIG. 2, and the method includes the following steps.

S301: A BBU receives M groups of signals, where each group of signals includes N signals, M is an integer greater than 0, and N is a maximum quantity of signals supported when a physical cell of the BBU demodulates a signal.

In an implementation, the BBU may receive the M groups of signals sent by M RRUs, and the RRU may include N transmit antennas. Therefore, one RRU can send N signals (where the N signals are a group of signals).

In another implementation, the BBU may receive the M groups of signals sent by an RHUB. In this implementation, the RHUB may receive the M groups of signals sent by M pRRUs connected to the RHUB, where the pRRU may include N transmit antennas. Therefore, one pRRU can send N signals (where the N signals are a group of signals). Alternatively, the RHUB may receive the M groups of signals sent by P pRRUs connected to the RHUB, where P is an integer greater than M, the RHUB divides the P pRRUs into M groups, and signals sent by each group of pRRUs are combined in time domain, to obtain the M groups of signals corresponding to M groups of pRRUs.

Figure 4:
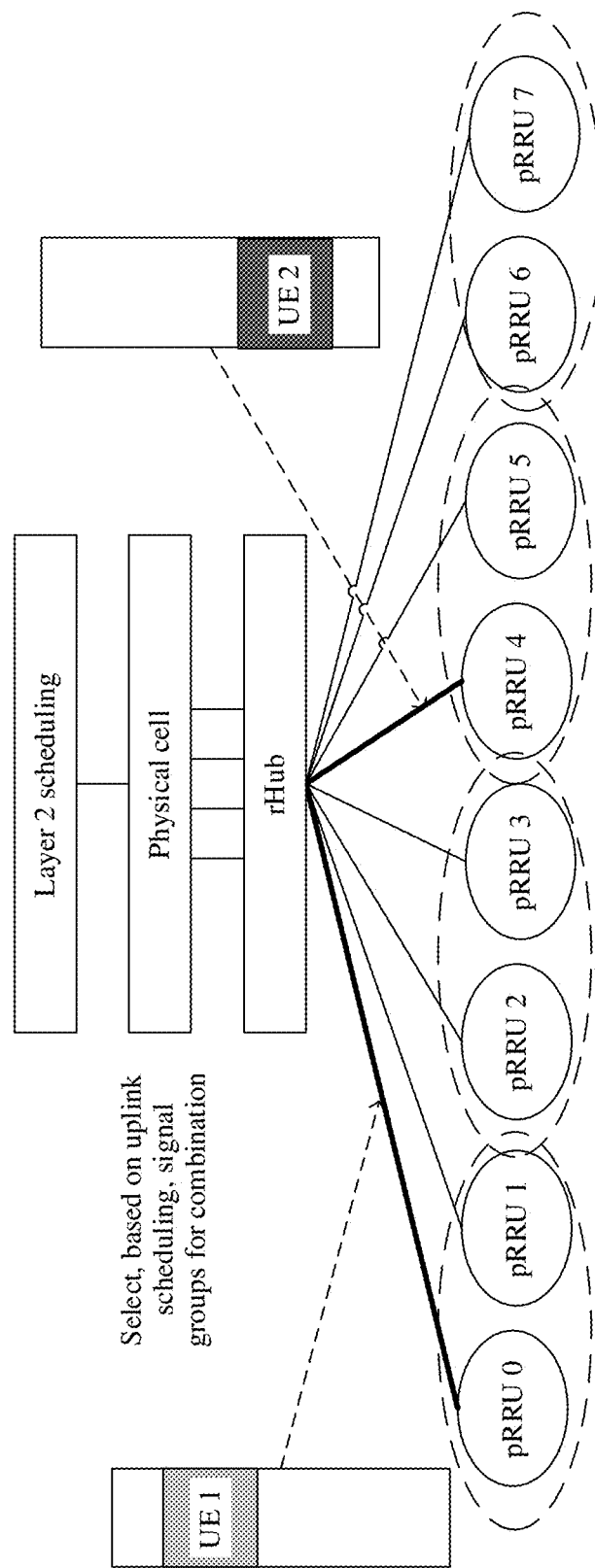
FIG. 4 is a schematic diagram of grouping and combination according to an embodiment of this application.

Specifically, the RHUB may divide the P pRRUs into the M groups in the following manner: The RHUB receives indication information sent by the BBU, where the indication information is used to indicate information about pRRUs that can be combined, so that the RHUB may divide the P pRRUs into the M groups based on the indication information. The following uses an example in which P is equal to 8, the P pRRUs are pRRU 0 to pRRU 7, and M is 4. It is assumed that the indication information sent by the BBU indicates the RHUB to combine the pRRU 0 and the pRRU 1, combine the pRRU 2 and the pRRU 3, combine the pRRU 4 and the pRRU 5, and combine the pRRU 6 and the pRRU 7. After receiving signals sent by the pRRU 0 to the pRRU 7, the RHUB combines, in time domain, N signals sent by the pRRU 0 and N signals sent by the pRRU 1, to obtain combined N signals. The combined N signals are sent to the BBU as a group of signals. Similarly, N signals obtained by combining the pRRU 2 and the pRRU 3 are sent to the BBU as a group of signals, N signals obtained by combining the pRRU 4 and the pRRU 5 are sent to the BBU as a group of signals, and N signals obtained by combining the pRRU 6 and the pRRU 7 are sent to the BBU as a group of signals, as shown in FIG. 4.

S302: The BBU determines H groups of signals that carry data and that are in the M groups of signals, where $0<H\leq M$.

In some embodiments, the BBU may determine, based on uplink scheduling information, the H groups of signals that carry data and that are in the M groups of signals. For example, the BBU may determine, based on an indication of a layer 2 (L2), the H groups of signals that carry data.

S303: The BBU combines the H groups of signals into one group of data.

In some examples, when combining the H groups of signals into one group of data, the BBU may first convert the H groups of signals to a frequency domain, to obtain H groups of frequency domain signals, and then combine the H groups of frequency domain signals.

In a specific implementation, when combining the H groups of frequency domain signals, the BBU may determine, for an $i^{th}$ frequency domain signal in each group of frequency domain signals, a frequency band that carries data and that is in the $i^{th}$ frequency domain signal, where i is an integer not greater than N; and the BBU may combine frequency bands that carry data and that are in the $i^{th}$ frequency domain signals in all groups of frequency domain signals, to obtain an $i^{th}$ signal in the group of data.

Specifically, when combining the frequency bands that carry data and that are in the $i^{th}$ frequency domain signals in all groups of frequency domain signals, the BBU may perform weighting based on a resource block (RB). To be specific, a weight value of an RB that carries data is 1, a weight value of an RB that does not carry data is 0, and weighted summation is performed on the $i^{th}$ frequency domain signals in all groups of frequency domain signals, to obtain the $i^{th}$ signal in the group of data.

In some other examples, when combining the H groups of signals into one group of data, the BBU may combine $i^{th}$ signals in all of the H groups of signals in time domain to obtain an $i^{th}$ signal in the group of data, where i is an integer not greater than N.

S304: The BBU demodulates the combined group of data.

In this embodiment of this application, the BBU receives the M groups of signals, combines the H groups of signals that carry data and that are in the M groups of signals, and demodulates the combined H groups of signals. In this manner, when the signals are combined, signals that do not carry data may not be combined, so that noise floors of the signals that do not carry data may not be combined, and uplink performance can be improved without reducing a quantity of pRRUs.

Figure 5:
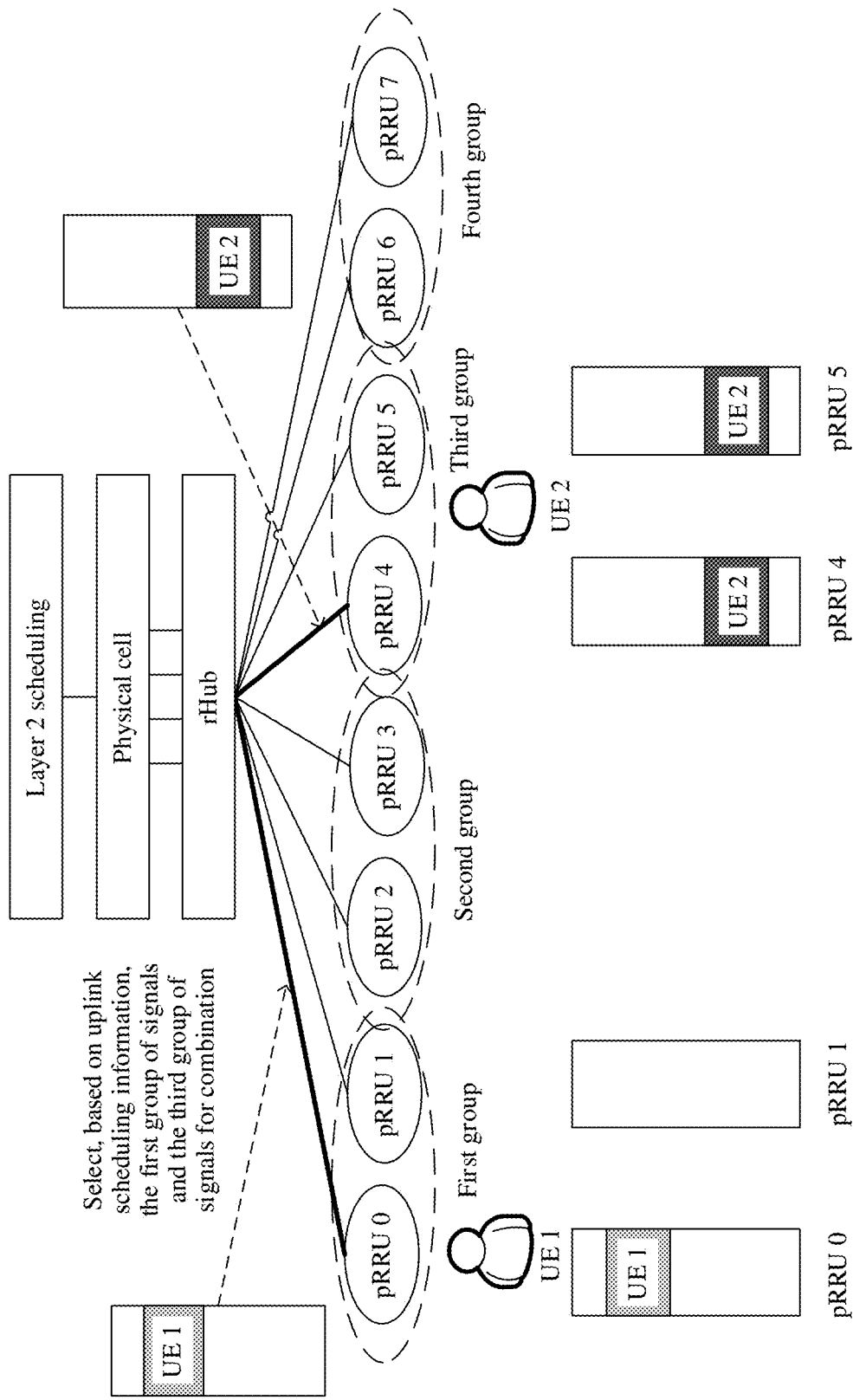
FIG. 5 is a schematic diagram of uplink signal demodulation according to an embodiment of this application.
Figure 6A:
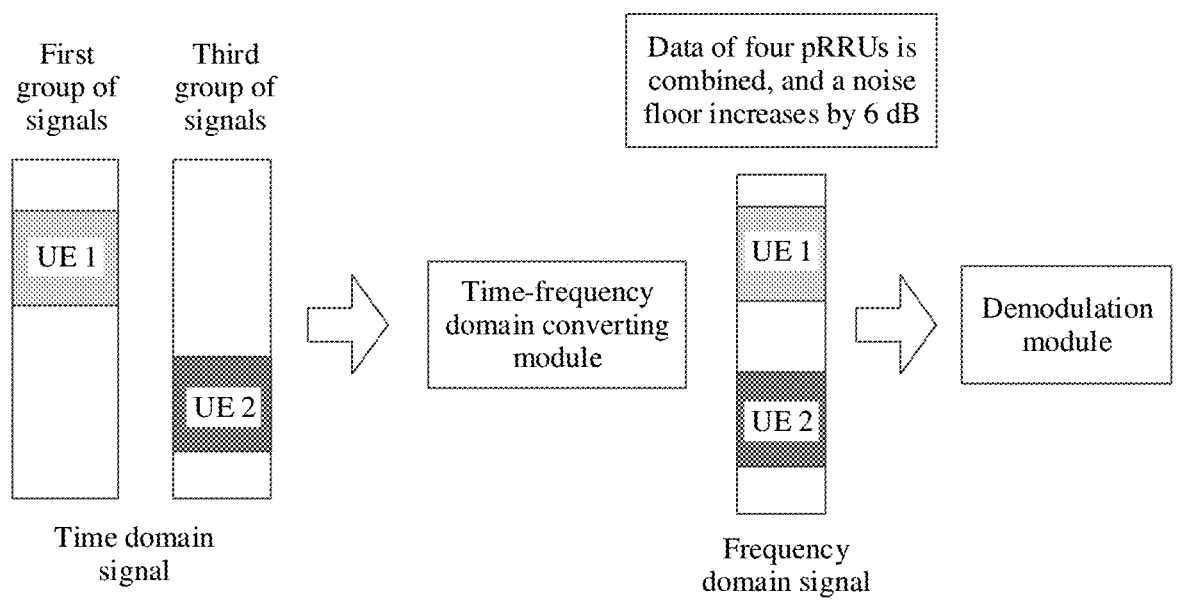
FIG. 6A is a schematic diagram of combining grouped and combined signals in time domain according to an embodiment of this application.
Figure 6B:
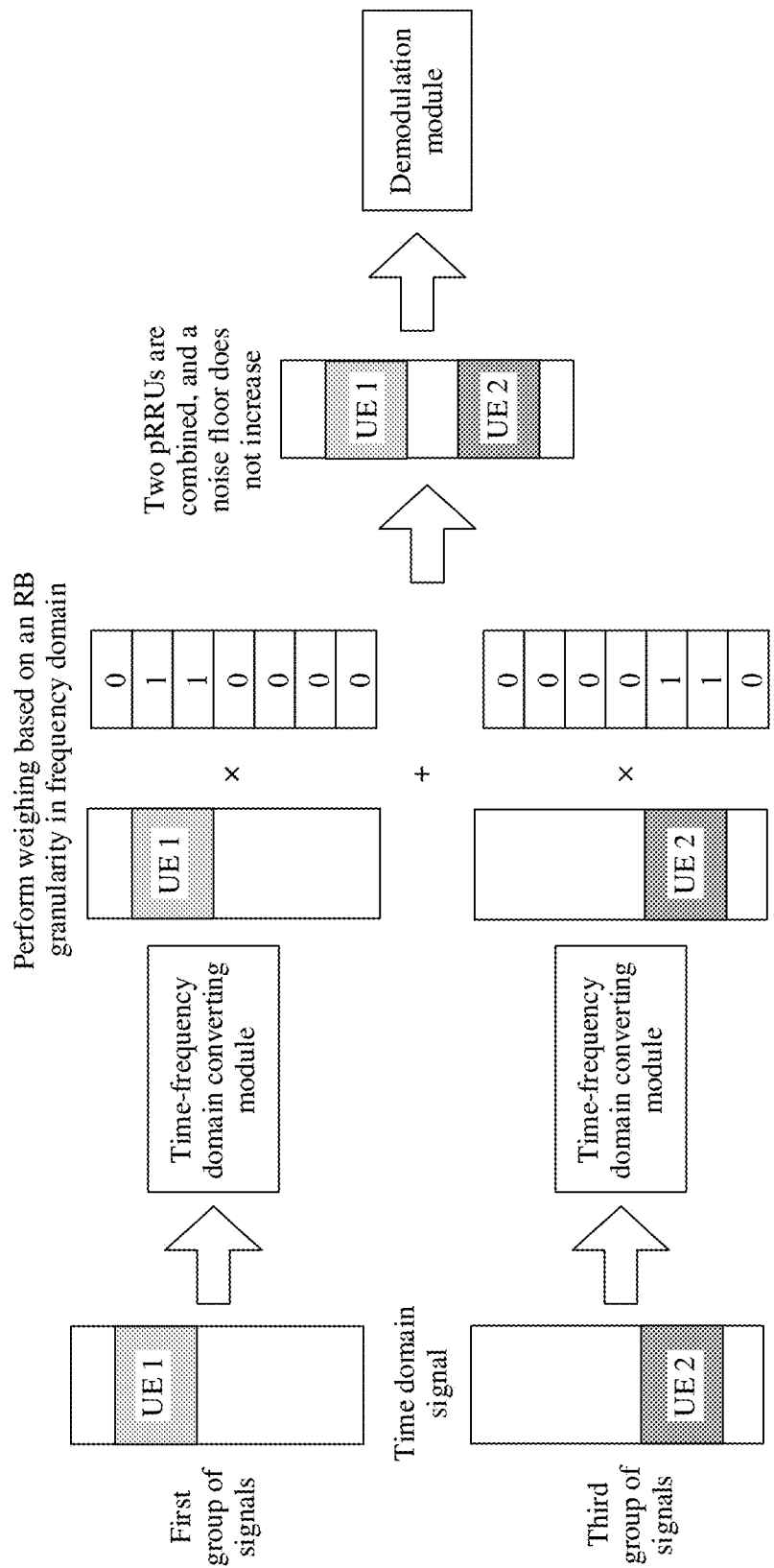
FIG. 6B is a schematic diagram of combining grouped and combined signals in frequency domain according to an embodiment of this application.

Four groups of signals shown in FIG. 4 are used as an example. The BBU may determine, based on the uplink scheduling information of the L2, that the pRRU 0, the pRRU 4, and the pRRU 5 carry data. Therefore, the BBU can determine that the first group of signals (namely, signals obtained by combining the pRRU 0 and the pRRU 1) and the third group of signals (namely, signals obtained by combining the pRRU 4 and the pRRU 5) carry data. Therefore, the BBU can combine the first group of signals and the third group of signals, and then demodulate the combined signal, as shown in FIG. 5. In this manner, when the pRRU 0 and the pRRU 1 are combined, a noise floor increases by $10 \times \log_{10}(2)=3$ dB. When the pRRU 4 and the pRRU 5 are combined, the noise floor increases by $10 \times \log_{10}(2)=3$ dB. If the first group of signals and the third group of signals are combined in time domain, after the first group of signals and the third group of signals are combined, the noise floor increases by 6 dB, as shown in FIG. 6A. If the first group of signals and the third group of signals are combined in frequency bands that carry data in frequency domain, after the first group of signals and the third group of signals are combined, the noise floor increases by 3 dB, as shown in FIG. 6B. Compared with a current technology in which the noise floor increases by $10 \times \log_{10}(8)=9$ dB after the pRRU 0 to the pRRU 7 are combined in time domain, this embodiment of this application can reduce the noise floor without reducing the quantity of pRRUs. Therefore, the uplink performance can be improved.

In addition, currently, a baseband processing resource of a physical cell is fixed. Therefore, a maximum quantity of signals, for example, N, supported when the physical cell demodulates a signal is fixed. In this case, the physical cell may support scheduling of a maximum of one RHUB. In this embodiment of this application, the physical cell may receive M×N signals, that is, the physical cell may support M RHUBs. It can be learned that in this embodiment of this application, a coverage area of the physical cell can be improved without affecting the uplink performance, thereby reducing costs.

Figure 7:
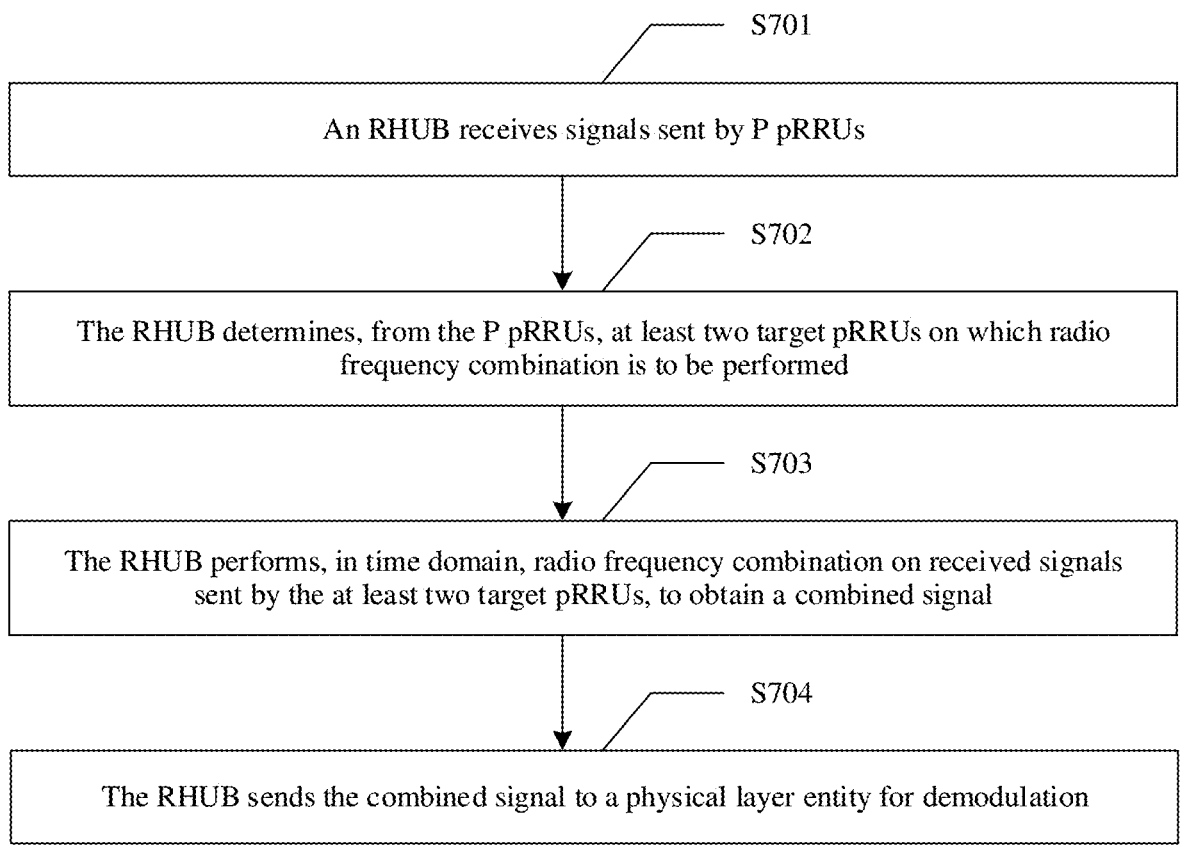
FIG. 7 is another flowchart of a communication method according to an embodiment of this application.

FIG. 7 is another flowchart of a communication method according to this application. The method may be applied to the network device shown in FIG. 1 or FIG. 2, and the method includes the following steps.

S701: An RHUB receives signals sent by P pRRUs, where P is an integer greater than or equal to 2.

The P pRRUs may be all of pRRUs connected to the RHUB, or the P pRRUs may be some of pRRUs connected to the RHUB. This is not specifically limited herein.

In some embodiments, a BBU may send first indication information to a pRRU, and the first indication information may be used to indicate whether the pRRU reports data. For example, as shown in FIG. 8, the first indication information may indicate that a pRRU 0 to a pRRU 9 report data to the RHUB in a current time period, so that the RHUB may receive signals sent by the pRRU 0 to the pRRU 9. "1" may be used to indicate that data can be reported in a corresponding time period (that is, "1" may be used to indicate that scheduling can be performed in the corresponding time period). "0" may be used to indicate that data cannot be reported in the corresponding time period (that is, "0" may be used to indicate that the scheduling may not be performed in the corresponding time period). Certainly, "1" may alternatively be used to indicate that data cannot be reported in a corresponding time period, and "0" may be used to indicate that data can be reported in the corresponding time period. This is not specifically limited herein.

S702: The RHUB determines, from the P pRRUs, at least two target pRRUs on which radio frequency combination is to be performed.

In an implementation, the RHUB may receive second indication information sent by the BBU, where the second indication information is used to indicate information about pRRUs on which radio frequency combination can be performed in each time period in a scheduling periodicity; or the second indication information may be used to indicate information about pRRUs scheduled in each time period in a scheduling periodicity. For example, the BBU may send a pattern to the RHUB, and the pattern may indicate pRRUs that are combined in each time period in the scheduling periodicity. For example, as shown in FIG. 9, "1" may be used to indicate that combination can be performed in a corresponding time period (that is, "1" indicates that scheduling can be performed in the corresponding time period). "o" indicates that the combination cannot be performed in the corresponding time period (that is, "o" indicates that the scheduling may not be performed in the corresponding time period). For example, a pRRU 0 to a pRRU 7 may be combined within 0 ms to 10 ms in the scheduling periodicity, a pRRU 8 to a pRRU 15 may be combined within 10 ms to 20 ms in the scheduling periodicity, a pRRU 16 to a pRRU 23 may be combined within 20 ms to 30 ms in the scheduling periodicity, and a pRRU 24 to a pRRU 31 may be combined within 30 ms to 40 ms in the scheduling periodicity. Certainly, "0" may alternatively be used to indicate that combination can be performed in a corresponding time period, and "1" indicates that the combination cannot be performed in the corresponding time period. This is not specifically limited herein.

Figure 10:
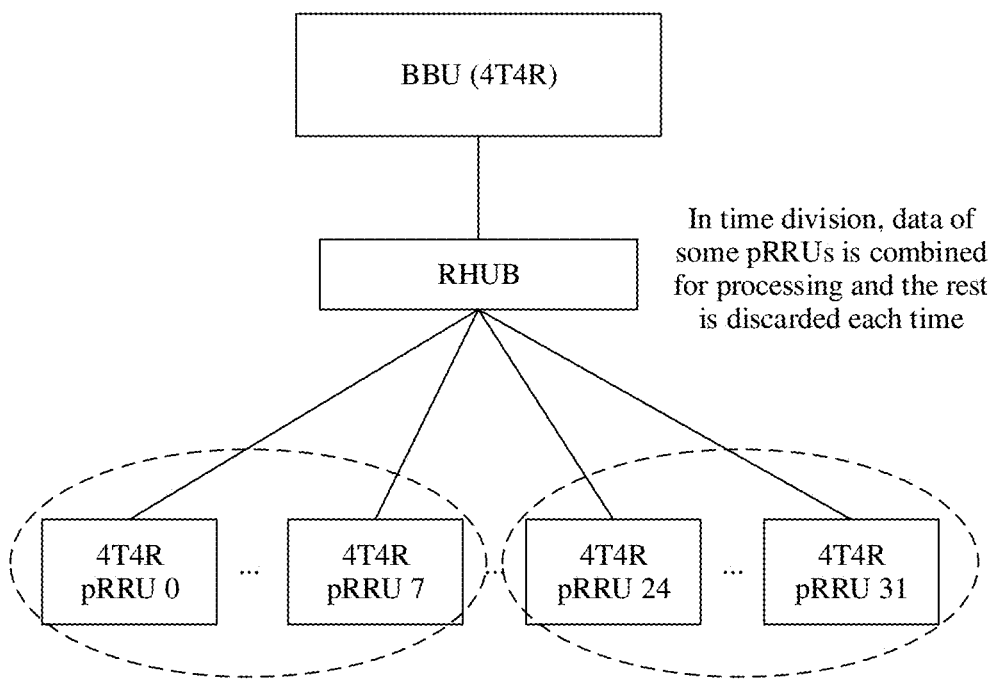
FIG. 10 is a schematic diagram of time division scheduling of an RHUB by an RHUB according to an embodiment of this application.

Further, the RHUB may divide the P pRRUs into M pRRU groups based on the indication information, where M is a quantity of divided time periods in the scheduling periodicity, and any pRRU group in the M pRRU groups includes pRRUs on which radio frequency combination can be performed in the corresponding time period. The RHUB determines a target pRRU group from the M pRRU groups, and determines a plurality of pRRUs included in the target pRRU group as the at least two target pRRUs on which radio frequency combination is to be performed, where the target pRRU group includes pRRUs on which radio frequency combination can be performed in a current time period, as shown in FIG. 10.

The pattern shown in FIG. 8 is used as an example. The RHUB may divide the pRRU 0 to the pRRU 31 into four groups, where the first group includes the pRRU 0 to the pRRU 7, the second group includes the pRRU 8 to the pRRU 15, the third group includes the pRRU 16 to the pRRU 23, and the fourth group includes the pRRU 24 to the pRRU 31. Within 0 ms to 10 ms in the scheduling periodicity, the pRRU 0 to the pRRU 7 included in the first group may be determined as target pRRUs on which radio frequency combination is to be performed. Within 10 ms to 20 ms in the scheduling periodicity, the pRRU 8 to the pRRU 15 included in the second group may be determined as target pRRUs on which radio frequency combination is to be performed. Within 20 ms to 30 ms in the scheduling periodicity, the pRRU 16 to the pRRU 23 included in the third group may be determined as target pRRUs on which radio frequency combination is to be performed. Within 30 ms to 40 ms in the scheduling periodicity, the pRRU 24 to the pRRU 31 included in the fourth group may be determined as target pRRUs on which radio frequency combination is to be performed.

In addition, the RHUB may further obtain priorities respectively corresponding to the M pRRU groups, and may adjust a scheduling sequence of the M pRRU groups based on the priorities respectively corresponding to the M pRRU groups. The pattern shown in FIG. 8 is used as an example. It is assumed that a priority index of the pRRU 0 to the pRRU 7 is 1, a priority index of the pRRU 8 to the pRRU 15 is 8, a priority index of the pRRU 16 to the pRRU 23 is 4, and a priority index of the pRRU 24 to the pRRU 31 is 9. A higher priority index corresponds to a higher priority. Therefore, the RHUB can adjust the scheduling sequence of the four pRRU groups as follows: The pRRU 24 to the pRRU 31 are scheduled within 0 ms to 10 ms in the scheduling periodicity, the pRRU 8 to the pRRU 15 are scheduled within 10 ms to 20 ms in the scheduling periodicity, the pRRU 16 to the pRRU 23 are scheduled within 20 ms to 30 ms in the scheduling periodicity, and the pRRU 0 to the pRRU 7 are scheduled within 30 to 40 ms in the scheduling periodicity.

In a first implementation, when obtaining the priorities respectively corresponding to the M pRRU groups, the RHUB may obtain, for each pRRU group in the M pRRU groups, a priority of a user who can be scheduled by each pRRU included in the pRRU group; the RHUB may determine a priority of the pRRU group based on the priority of the user who can be scheduled by each pRRU included in the pRRU group.

In a specific implementation, when determining the priority of the pRRU group based on the priority of the user who can be scheduled by each pRRU included in the pRRU group, the RHUB may accumulate the priority of the user who can be scheduled by each pRRU included in the pRRU group, to obtain the priority of the pRRU group.

In a second implementation, the RHUB may further collect statistics on priorities of pRRU groups in at least two scheduling periodicities, where the priorities of the pRRU groups in all scheduling periodicities may be determined in the first implementation. The RHUB determines an average priority value of the pRRU group based on the priorities of the pRRU groups in the at least two scheduling periodicities, and uses the average priority value as the priority of the pRRU group.

S703: The RHUB performs, in time domain, radio frequency combination on received signals sent by the at least two target pRRUs, to obtain a combined signal.

S704: The RHUB sends the combined signal to a physical layer entity for demodulation.

Figure 11:
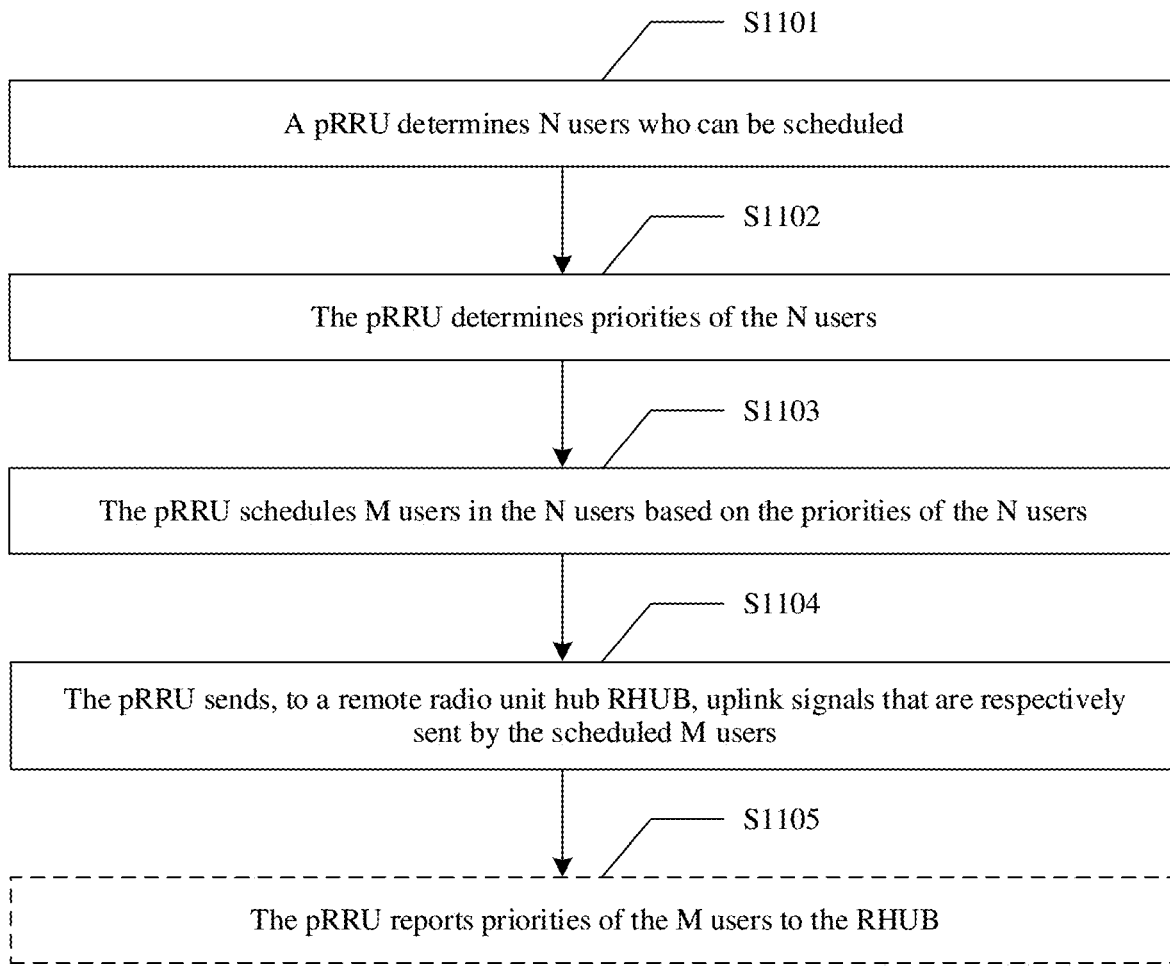
FIG. 11 is a flowchart of sending a signal by a pRRU to an RHUB according to an embodiment of this application.

In this embodiment of this application, the pRRU may send the signal to the RHUB by using the following steps S1201 to S1204, as shown in FIG. 11.

S1101: A pRRU determines N users who can be scheduled.

In a specific implementation, the pRRU may receive sounding reference signals SRSs respectively sent by a plurality of users, and determine that the N users sending SRSs whose signal strengths are greater than a preset threshold are users who can be scheduled.

S1102: The pRRU determines priorities of the N users.

In some embodiments, the pRRU may use an original algorithm (for example, proportional fairness (PF) scheduling) to determining a priority of a user. Specifically, the pRRU may calculate a proportional fairness factor for the user based on current signal quality and historical throughput characteristics of the user, and determine the priority of the user based on a value of the proportional fairness factor.

S1103: The pRRU schedules M users in the N users based on the priorities of the N users, where $0 < M \leq N$, and both N and M are integers.

Specifically, for each user of the N users, the pRRU may determine the user based on the priority of the user. If the priority of the user is higher than a preset priority, the pRRU schedules the user; otherwise, the pRRU does not schedule the user.

S1104: The pRRU sends, to an RHUB, uplink signals that are respectively sent by the scheduled M users.

In addition, after step S1104 is performed, step S1105 may be performed.

S1105: The pRRU reports priorities of the M users to the RHUB. Therefore, the RHUB may determine a priority of the pRRU based on the priorities of the M users, and further may adjust a scheduling sequence of the pRRU based on the priority of the pRRU.

In this embodiment of this application, the RHUB selects some pRRUs from all pRRUs to perform radio frequency combination, so that a quantity of pRRUs participating in radio frequency combination is reduced, and a noise floor during radio frequency combination can be reduced. In this way, uplink performance can be improved without reducing a quantity of pRRUs.

Figure 12:
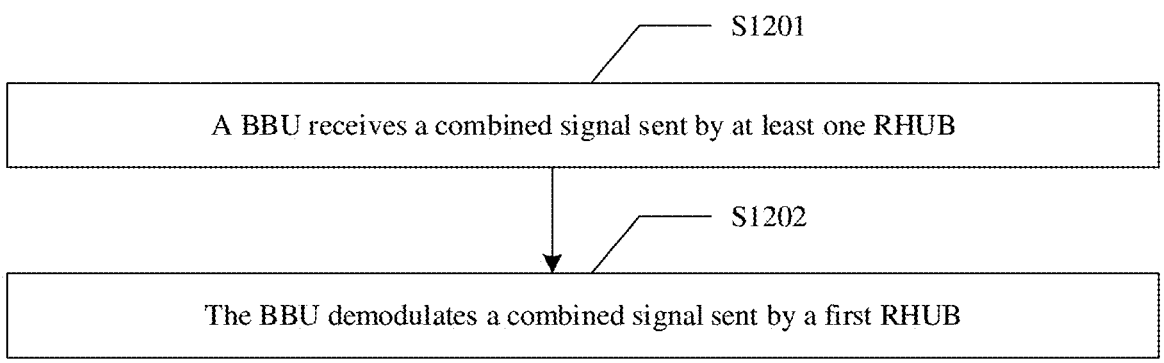
FIG. 12 is another flowchart of a communication method according to an embodiment of this application.

FIG. 12 is another flowchart of a communication method according to this application. The method may be applied to the network device shown in FIG. 1 or FIG. 2. A BBU in the network device may be connected to a plurality of RHUBs. The method includes the following steps.

S1201: The BBU receives a combined signal sent by at least one RHUB.

In an implementation, an RHUB receives signals sent by a plurality of pRRUs connected to the RHUB, combines the signals sent by the plurality of pRRUs in time domain to obtain the combined signal, and then sends the combined signal to the RHUB.

In another implementation, the RHUB may send the combined signal to the RHUB by using the method shown in FIG. 7.

In a specific implementation, the BBU may buffer the combined signal sent by the at least one RHUB. For example, the BBU is connected to four RHUBs. It is assumed that a pRRU connected to the RHUB is a 4T4R radio frequency unit. Therefore, each RHUB sends four signals to the BBU. In this case, the BBU may buffer 4×4=16 signals sent by four RHUBs, as shown in FIG. 10.

S1202: The BBU demodulates a combined signal sent by a first RHUB, where the first RHUB is any RHUB in the at least one RHUB.

In this embodiment of this application, the BBU selects one RHUB from all RHUBs for demodulation, so that a maximum quantity of combined pRRUs supported by a single physical cell can be increased without changing uplink performance and an RHUB specification, thereby increasing a coverage area. For example, in a current technology, a physical cell supports signal processing of one RHUB. Therefore, a physical cell entity may be connected to one RHUB. Assuming that one RHUB is connected to a maximum of 16 pRRUs, a coverage area of one physical cell is a coverage area covered by the 16 pRRUs. According to the method provided in this application, one physical cell can support two or more RHUBs. In this case, a coverage area of one physical cell may be a coverage area covered by 32 pRRUs or more pRRUs. In addition, when the coverage area is increased, the uplink performance may not be affected.

In some embodiments, before demodulating the combined signal sent by the first RHUB, the BBU may further determine that a priority of the first RHUB is the highest in the at least one RHUB.

A manner in which the BBU determines a priority of the RHUB is similar to a manner in which the RHUB determines a priority of a pRRU group. For a specific process, refer to a process in which the RHUB determines the priority of the pRRU group in the communication method shown in FIG. 7. Details are not described herein again.

Figure 13:
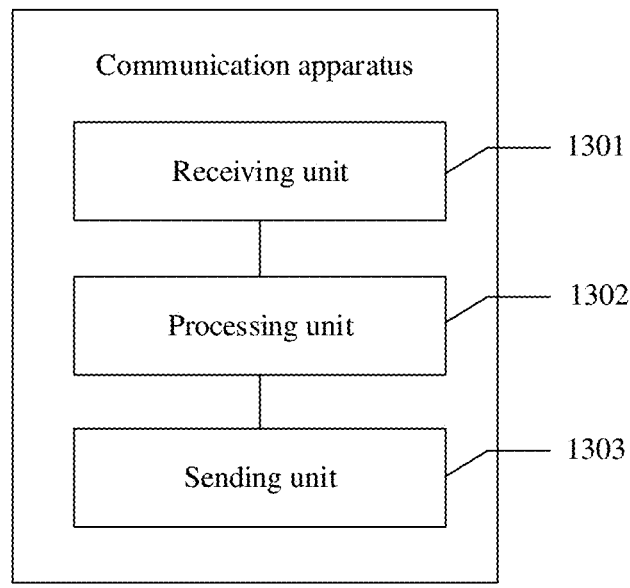
FIG. 13 is a schematic diagram of a structure of a communication device according to an embodiment of this application.

Based on a same invention concept as that of the method embodiments, an embodiment of this application provides a communication apparatus. A structure of the communication apparatus may be shown in FIG. 13, and the communication apparatus includes a receiving unit 1301, a processing unit 1302, and a sending unit 1303.

In a specific implementation, the communication apparatus may be specifically configured to implement the method performed by the BBU in the embodiment shown in FIG. 3. The apparatus may be the BBU, or may be a chip or a chip set in the BBU, or a part that is of the chip and that is configured to perform a related method function. The receiving unit 1301 is configured to receive M groups of signals, where each group of signals includes N signals, M is an integer greater than 0, and N is a maximum quantity of signal supported when a physical cell of the BBU demodulates a signal. The processing unit 1302 is configured to: determine H groups of signals that carry data and that are in the M groups of signals, where $0<H\leq M$; combine the H groups of signals into one group of data; and demodulate the combined group of data.

Specifically, when combining the H groups of signals into one group of data, the processing unit 1302 may be specifically configured to: convert the H groups of signals to a frequency domain, to obtain H groups of frequency domain signals; combine the H groups of frequency domain signals.

When combining the H groups of frequency domain signals, the processing unit 1302 may be specifically configured to: for an $i^{th}$ frequency domain signal in each group of frequency domain signals, determine a frequency band that carries data and that is in the $i^{th}$ frequency domain signal, where i is an integer not greater than N; combine frequency bands that carry data and that are in the $i^{th}$ frequency domain signals in all groups of frequency domain signals, to obtain an $i^{th}$ signal in the group of data.

When combining the H groups of signals into one group of data, the processing unit 1302 may be specifically configured to: combine $i^{th}$ signals in all of the H groups of signals in time domain to obtain an $i^{th}$ signal in the group of data, where i is an integer not greater than N.

For example, at least one group of signals in the M groups of signals may be obtained after an RHUB combines, in time domain, signals sent by a plurality of pRRUs.

In another specific implementation, the communication apparatus may be specifically configured to implement the method performed by the RHUB in the embodiment shown in FIG. 7. The apparatus may be the RHUB, or may be a chip or a chip set in the RHUB, or a part that is of the chip and that is configured to perform a related method function. The receiving unit 1301 is configured to receive signals sent by P pRRUs, where P is an integer greater than or equal to 2. The processing unit 1302 is configured to: determine, from the P pRRUs, at least two target pRRUs on which radio frequency combination is to be performed; perform, in time domain, radio frequency combination on received signals sent by the at least two target pRRUs, to obtain a combined signal. The sending unit 1303 is configured to send the combined signal to a physical layer entity for demodulation.

In an implementation, the receiving unit 1301 may be further configured to receive indication information sent by a BBU, where the indication information is used to indicate information about pRRUs on which radio frequency combination can be performed in each time period in a scheduling periodicity. When determining, from N pRRUs, at least two target pRRUs on which radio frequency combination is to be performed, the processing unit 1302 may be specifically configured to: divide the P pRRUs into M pRRU groups based on the indication information, where M is a quantity of divided time periods in the scheduling periodicity, and any pRRU group in the M pRRU groups includes pRRUs on which radio frequency combination can be performed in a corresponding time period; determine a target pRRU group from the M pRRU groups, and determine a plurality of pRRUs included in the target pRRU group as the at least two target pRRUs on which radio frequency combination is to be performed, where the target pRRU group includes pRRUs on which radio frequency combination can be performed in a current time period.

In an implementation, the receiving unit 1301 may be further configured to obtain priorities respectively corresponding to the M pRRU groups. When determining the target pRRU group from the M pRRU groups, the processing unit 1302 may be specifically configured to: adjust a sequence of the M pRRU groups based on the priorities respectively corresponding to the M pRRU groups; determine the target pRRU group based on an adjusted sequence.

Specifically, when obtaining the priorities respectively corresponding to the M pRRU groups, the processing unit 1302 may be configured to: obtain, for each pRRU group in the M pRRU groups, a priority of a user who can be scheduled by each pRRU included in the pRRU group; determine a priority of the pRRU group based on the priority of the user who can be scheduled by each pRRU included in the pRRU group.

In another specific implementation, the communication apparatus may be specifically configured to implement the method performed by the pRRU in the embodiment shown in FIG. 11. The apparatus may be the pRRU, or may be a chip or a chip set in the pRRU, or a part that is of the chip and that is configured to perform a related method function. The processing unit 1302 is configured to: determine N users who can be scheduled; determine priorities of the N users; schedule M users in the N users based on the priorities of the N users, where $0<M\leq N$, and both N and M are integers. The sending unit 1303 is configured to send, to an RHUB, uplink signals that are respectively sent by the scheduled M users.

In an implementation, the receiving unit 1301 may be configured to receive sounding reference signals SRSs respectively sent by a plurality of users. When determining the N users who can be scheduled, the processing unit 1302 may be specifically configured to determine that the N users sending SRSs whose signal strengths are greater than the preset threshold are users who can be scheduled.

In addition, before the pRRU determines the N users who can be scheduled, the processing unit 1302 may be further configured to determine that data needs to be reported to the RHUB.

In an example, the receiving unit 1301 may be further configured to receive indication information sent by a baseband processing unit, where the indication information is used to indicate a time point at which the pRRU reports the data. When determining that the data needs to be reported to the RHUB, the processing unit 1302 may be specifically configured to: when the time point arrives, determine that the data needs to be reported to the RHUB.

For example, the sending unit 1303 may be further configured to report priorities of the M users to the RHUB.

Division into modules in the embodiments of this application is an example, is only logical function division, and may be other division during actual implementation. In addition, function modules in the embodiments of this application may be integrated into one processor, or may exist alone physically, or two or more modules may be integrated into one module. The integrated module may be implemented in a form of hardware, or may be implemented in a form of a software function module. It may be understood that, for functions or implementations of the modules in the embodiments of this application, further refer to related descriptions in the method embodiments.

Figure 14:
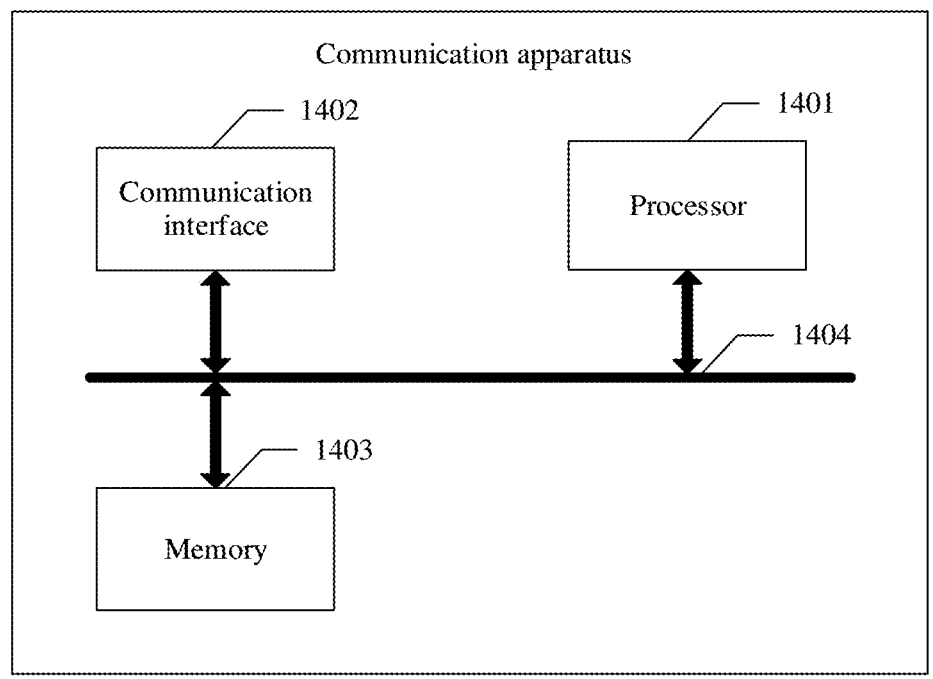
FIG. 14 is a schematic diagram of a structure of a communication device according to an embodiment of this application.

In a possible manner, the communication apparatus may be shown in FIG. 14. The apparatus may be a network device or a chip in the network device, and the network device may be a BBU, an RHUB, or a pRRU. The apparatus may include a processor 1401, a communication interface 1402, and a memory 1403. The processing unit 1302 may be the processor 1401. The receiving unit 1301 and the sending unit 1303 may be the communication interface 1402.

The processor 1401 may be a central processing unit (central processing unit, CPU), a digital processing unit, or the like. The communication interface 1402 may be a transceiver, an interface circuit such as a transceiver circuit, a transceiver chip, or the like. The apparatus further includes the memory 1403, configured to store a program executed by the processor 1401. The memory 1403 may be a nonvolatile memory, for example, a hard disk drive (HDD) or a solid-state drive (SSD), or may be a volatile memory, for example, a random access memory (RAM). The memory 1403 is any other medium that can carry or store expected program code in a form of an instruction or a data structure and can be accessed by a computer, but is not limited thereto.

The processor 1401 is configured to execute the program code stored in the memory 1403, and is specifically configured to perform an action of the processing unit 1302. Details are not described in this application again.

The communication interface 1402 is specifically configured to perform actions of the receiving unit 1301 and the sending unit 1303. Details are not described in this application again.

A specific connection medium between the communication interface 1401, the processor 1402, and the memory 1403 is not limited in this embodiment of this application. In this embodiment of this application, in FIG. 14, the memory 1403, the processor 1402, and the communication interface 1401 are connected through a bus 1404. The bus is represented by using a thick line in FIG. 14, and a connection manner between other parts is merely used as an example for description, and does not limit this application. The bus may be classified into an address bus, a data bus, a control bus, and the like. For ease of representation, only one thick line is used to represent the bus in FIG. 14, but this does not mean that there is only one bus or only one type of bus.

An embodiment of the present invention further provides a computer-readable storage medium, configured to store computer software instructions that need to be executed by the foregoing processor. The computer software instructions include a program that needs to be executed by the foregoing processor.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

The computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more procedures in the flowcharts and/or in one or more blocks in the block diagrams.

The computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide a step for implementing the specific function in one or more procedures in the flowcharts and/or in one or more blocks in the block diagrams.

It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A method, comprising:
 receiving, by a baseband processing unit (BBU), M groups of signals, wherein each group of signals of the M groups of signals comprises respective N signals, M is an integer greater than 0, and N is a maximum quantity of signals supported when a physical cell of the BBU demodulates a signal;

determining, by the BBU from the M groups of signals, H groups of signals, wherein 0<H≤M, wherein the H groups of signals represent each group of signals that carries data, wherein a group of signals is determined to carry data based on uplink scheduling information;

combining, by the BBU, the H groups of signals into a combined group of data;

demodulating, by the BBU, the combined group of data;

receiving, by a remote radio unit hub (RHUB), signals sent by P pico remote radio units (pRRUs), wherein P is an integer greater than or equal to 2;

determining, by the RHUB from the P pRRUs, at least two target pRRUs on which radio frequency combination is to be performed;

performing, by the RHUB in time domain, radio frequency combination on received signals sent by the at least two target pRRUs, to obtain a combined signal;

sending, by the RHUB, the combined signal to a physical layer entity for demodulation;

receiving, by the RHUB, indication information sent by the BBU, wherein the indication information indicates information about pRRUs on which radio frequency combination is to be performed in each time period in a scheduling periodicity;

wherein determining, by the RHUB from the P pRRUs, the at least two target pRRUs on which radio frequency combination is to be performed, comprises:

dividing, by the RHUB, the P pRRUs into Q pRRU groups based on the indication information, wherein Q is a quantity of divided time periods in the scheduling periodicity, and any pRRU group in the Q pRRU groups comprises pRRUs on which radio frequency combination is performed in a corresponding time period; and determining, by the RHUB, a target pRRU group from the Q pRRU groups, and determining a plurality of pRRUs comprised in the target pRRU group as the at least two target pRRUs on which radio frequency combination is to be performed, wherein the target pRRU group comprises pRRUs on which radio frequency combination is to be performed in a current time period.

2. The method according to claim 1, wherein combining, by the BBU, the H groups of signals into the combined group of data comprises:

converting, by the BBU, the H groups of signals to a frequency domain, to obtain H groups of frequency domain signals; and combining, by the BBU, the H groups of frequency domain signals.

3. The method according to claim 2, wherein combining, by the BBU, the H groups of frequency domain signals comprises:

for an $i^{th}$ frequency domain signal in each group of frequency domain signals of the H groups of frequency domain signals, determining, by the BBU, a frequency band that carries data and that is in the $i^{th}$ frequency domain signal, wherein i is an integer not greater than N; and combining, by the BBU, frequency bands that carry data and that are in the $i^{th}$ frequency domain signals in all groups of frequency domain signals, to obtain an $i^{th}$ signal in the combined group of data.

4. The method according to claim 1, wherein combining, by the BBU, the H groups of signals into the combined group of data comprises:

combining, by the BBU, $i^{th}$ signals in all of the H groups of signals in time domain, to obtain an $i^{th}$ signal in the combined group of data, wherein i is an integer not greater than N.

5. The method according to claim 1, wherein at least one group of signals in the M groups of signals is obtained after a remote radio unit hub (RHUB) combines, in time domain, signals sent by a plurality of pico remote radio units (pRRUs).

6. The method according to claim 1, further comprising:

obtaining, by the RHUB, priorities respectively corresponding to the Q pRRU groups; and wherein determining, by the RHUB, the target pRRU group from the Q pRRU groups comprises:

adjusting, by the RHUB, a sequence of the Q pRRU groups based on the priorities respectively corresponding to the Q pRRU groups, to obtain an adjusted sequence; and determining, by the RHUB, the target pRRU group based on an adjusted sequence.

7. The method according to claim 6, wherein obtaining, by the RHUB, the priorities respectively corresponding to the Q pRRU groups comprises:

for each pRRU group in the Q pRRU groups, obtaining, by the RHUB, a priority of a user who can be scheduled by each pRRU comprised in a respective pRRU group; and for each pRRU group in the Q pRRU groups, determining, by the RHUB, a priority of the respective pRRU group based on the priority of the user who can be scheduled by each pRRU comprised in the pRRU group.

8. A system comprising:

a baseband processing unit (BBU) comprising:

a transceiver, configured to receive M groups of signals, wherein each group of signals of the M groups of signals comprises respective N signals, M is an integer greater than 0, and N is a maximum quantity of signals supported when a physical cell of the BBU demodulates a signal; and a processor, configured to:

determine, from the M groups of signals, H groups of signals that carry data, wherein 0<H≤M, wherein the H groups of signals represent each group of signals that carries data, wherein a group of signals is determined to carry data based on uplink scheduling information;

combine the H groups of signals into a combined group of data; and demodulate the combined group of data;

a remote radio unit hub (RHUB) comprising:

a transceiver configured to:

receive signals sent by P pico remote radio units (pRRUs), wherein P is an integer greater than or equal to 2;

send a combined signal to a physical layer entity for demodulation;

receive indication information sent by the BBU, wherein the indication information indicates information about pRRUs on which radio frequency combination is to be performed in each time period in a scheduling periodicity; and a processor configured to:

determine, from the P pRRUs, at least two target pRRUs on which radio frequency combination is to be performed;

perform, in time domain, radio frequency combination on received signals sent by the at least two target pRRUs, to obtain the combined signal;

wherein to determine, from the P pRRUs, the at least two target pRRUs on which radio frequency combination is to be performed, the RHUB is configured to:

divide the P pRRUs into Q pRRU groups based on the indication information, wherein Q is a quantity of divided time periods in the scheduling periodicity, and any pRRU group in the Q pRRU groups comprises pRRUs on which radio frequency combination is performed in a corresponding time period; and determine a target pRRU group from the Q pRRU groups, and determining a plurality of pRRUs comprised in the target pRRU group as the at least two target pRRUs on which radio frequency combination is to be performed, wherein the target pRRU group comprises pRRUs on which radio frequency combination is to be performed in a current time period.

9. The system according to claim 8, wherein the processor of the BBU is configured to:

convert the H groups of signals to frequency domain, to obtain H groups of frequency domain signals; and combine the H groups of frequency domain signals.

10. The system according to claim 9, wherein the processor of the BBU is configured to:

for an $i^{th}$ frequency domain signal in each group of frequency domain signals of the H groups of frequency domain signals, determine a frequency band that carries data and that is in the $i^{th}$ frequency domain signal, wherein i is an integer not greater than N; and combine frequency bands that carry data and that are in the $i^{th}$ frequency domain signals in all groups of frequency domain signals, to obtain an $i^{th}$ signal in the combined group of data.

11. The system according to claim 8, wherein the processor of the BBU is configured to:

combine $i^{th}$ signals in all of the H groups of signals in time domain, to obtain an $i^{th}$ signal in the combined group of data, wherein i is an integer not greater than N.

12. The system according to claim 8, wherein at least one group of signals in the M groups of signals is obtained after the remote radio unit hub (RHUB) combines, in time domain, signals sent by a plurality of pico remote radio units (pRRUs).

13. A non-transitory computer-readable storage medium storing a program that is executable by at least one processor, the program including instructions for:

receiving, by a baseband processing unit (BBU), M groups of signals, wherein each group of signals of the M groups of signals comprises respective N signals, M is an integer greater than 0, and N is a maximum quantity of signals supported when a physical cell of the BBU demodulates a signal, wherein H groups of signals represent each group of signals that carries data, wherein a group of signals is determined to carry data based on uplink scheduling information;

determining, by the BBU, from the M groups of signals, H groups of signals that carry data, wherein 0<H≤M;

combining, by the BBU, the H groups of signals into a combined group of data;

demodulating, by the BBU, the combined group of data;

receiving, by a remote radio unit hub (RHUB), signals sent by P pico remote radio units (pRRUs), wherein P is an integer greater than or equal to 2;

determining, by the RHUB from the P pRRUs, at least two target pRRUs on which radio frequency combination is to be performed;

performing, by the RHUB in time domain, radio frequency combination on received signals sent by the at least two target pRRUs, to obtain a combined signal;

sending, by the RHUB, the combined signal to a physical layer entity for demodulation;

receiving, by the RHUB, indication information sent by the BBU, wherein the indication information indicates information about pRRUs on which radio frequency combination is to be performed in each time period in a scheduling periodicity;

wherein determining, by the RHUB from the P pRRUs, the at least two target pRRUs on which radio frequency combination is to be performed, comprises:

dividing, by the RHUB, the P pRRUs into Q pRRU groups based on the indication information, wherein Q is a quantity of divided time periods in the scheduling periodicity, and any pRRU group in the Q pRRU groups comprises pRRUs on which radio frequency combination is performed in a corresponding time period; and determining, by the RHUB, a target pRRU group from the Q pRRU groups, and determining a plurality of pRRUs comprised in the target pRRU group as the at least two target pRRUs on which radio frequency combination is to be performed, wherein the target pRRU group comprises pRRUs on which radio frequency combination is to be performed in a current time period.

14. The non-transitory computer-readable storage medium according to claim 13, wherein the program includes instructions for:

converting, by the BBU, the H groups of signals to frequency domain, to obtain H groups of frequency domain signals; and combining, by the BBU, the H groups of frequency domain signals.

15. The non-transitory computer-readable storage medium according to claim 14, wherein the program includes instructions for:

for an ith frequency domain signal in each group of frequency domain signals of the H groups of frequency domain signals, determining, by the BBU, a frequency band that carries data and that is in the ith frequency domain signal, wherein i is an integer not greater than N; and combining, by the BBU, frequency bands that carry data and that are in the ith frequency domain signals in all groups of frequency domain signals, to obtain an ith signal in the combined group of data.

16. The non-transitory computer-readable storage medium according to claim 13, wherein the program includes instructions for:

combining, by the BBU, $i^{th}$ signals in all of the H groups of signals in time domain, to obtain an $i^{th}$ signal in the combined group of data, wherein i is an integer not greater than N.

17. The non-transitory computer-readable storage medium according to claim 13, wherein at least one group of signals in the M groups of signals is obtained after the remote radio unit hub (RHUB) combines, in time domain, signals sent by a plurality of pico remote radio units (pRRUs).

18. The method according to claim 1, wherein the physical cell supports a plurality of remote radio unit hubs (RHUBs).

* * * * *